B. R. HARNESS.
Stalk-Cutters.

No. 140,413.    Patented July 1, 1873.

Witnesses.
S. N. Pool
Isaac D. Sailer

Inventor.
Benjamin R. Harness.
By James L. Norris.
Atty.

UNITED STATES PATENT OFFICE.

BENJAMIN R. HARNESS, OF SCHOOLEY'S STATION, OHIO.

IMPROVEMENT IN STALK-CUTTERS.

Specification forming part of Letters Patent No. 140,413, dated July 1, 1873; application filed April 29, 1873.

*To all whom it may concern:*

Be it known that I, BENJAMIN R. HARNESS, of Schooley's Station, in the county of Ross and State of Ohio, have invented certain new and useful Improvements in Cornstalk-Cutters, of which the following is a specification:

This invention has for its object to furnish a simple and effective machine for cutting cornstalks in the field into short lengths, to enable the same to be turned under the earth in the subsequent plowing operation, thus utilizing the stalks as a fertilizing material. This invention consists of a rigid cutter secured to a cross-beam of the frame and supported against a backward movement by the carriage, and combining therewith a star-shaped cutting-wheel, mounted on the axle carrying the transporting-wheels, all as will more fully hereinafter appear.

Figure 1:
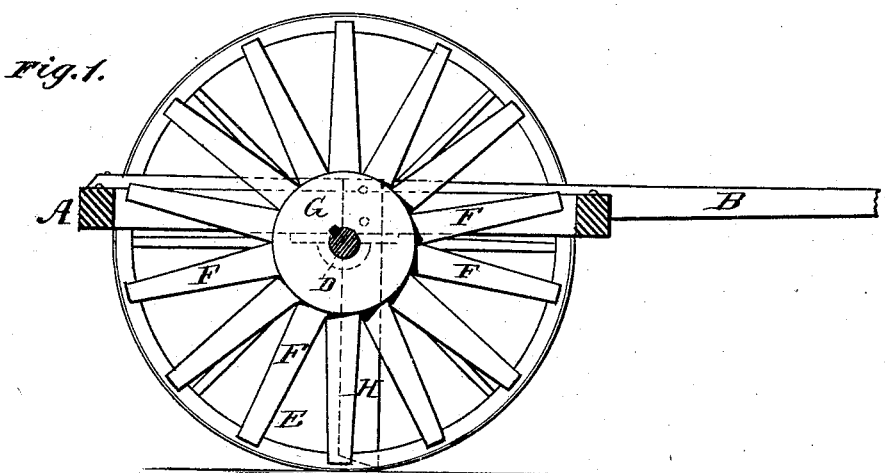
Figure 2:
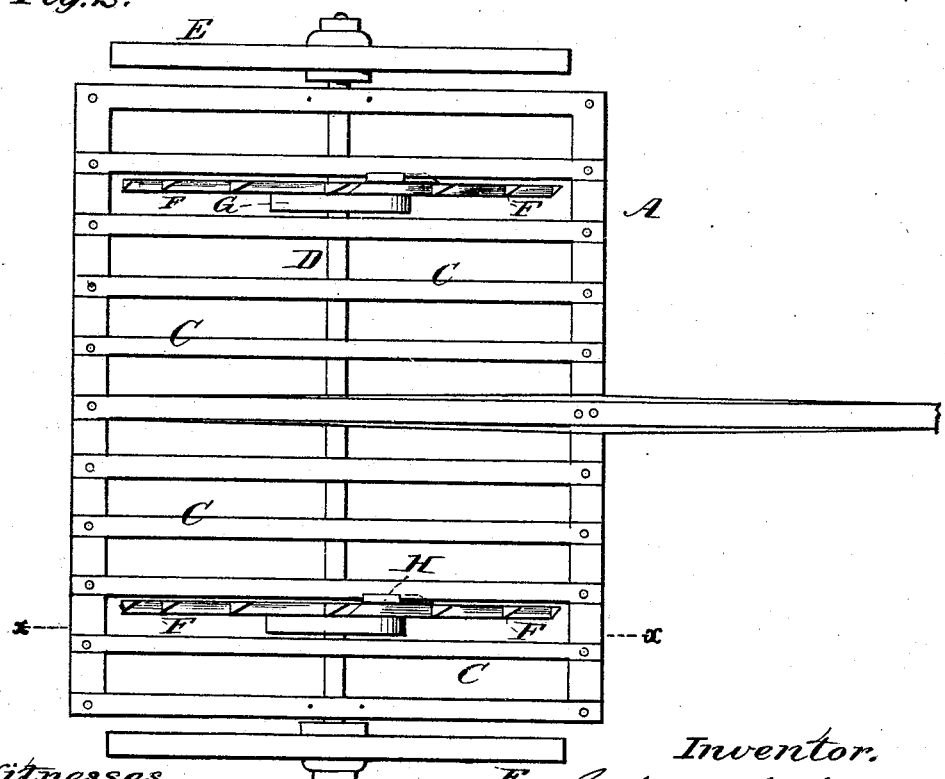

In the drawings, Figure 1 is a section through the machine, representing the arrangement of cutters for cutting cornstalks. Fig. 2 is a plan or top view of the same.

The frame A, which carries the stalk-cutting mechanism, is generally of a rectangular form, with a centrally-located draft tongue or pole, B, and has mortised into it or otherwise attached to the same a series of beams or bars, C, between which the cutting devices operate. A transverse shaft, D, extending entirely across the frame, is journaled in suitable boxes, and carries at each end a large transporting or traction wheel, E, as shown. On the shaft D are mounted a series of star-shaped cutting-wheels, located the required distance apart, according to the length into which it is desired to cut the stalks. Said star-shaped cutting-wheels are formed of a series of cutters or arms, F, with sharpened or beveled front edges, which project radially from hubs or collars G, keyed or otherwise held stationary on the shaft D, the cutting-arms being either formed with the hubs or separately attached to the same by screw-shanks, or other means, to enable them to be readily detached when broken, or for sharpening when they become worn. Each cutter-wheel is separate or distinct in its operation, and is arranged in proper relation to a pendant fixed cutter or knife, H, which is attached to the beam C by a yoke or stirrup, or other suitable clamping device.

In the operation of cutting stalks the first step necessary is to throw down the stalks to the ground so as to cause them to lie on the top of the ridge or hill, which operation is performed by any suitable means, and then by drawing the machine transversely across the ridges the stalks will be subjected to the action of the revolving star-shaped cutters and fixed knives, arranged in co-operative relation thereto, thus producing a shear-like action upon the stalks, cutting the same into short lengths, the size of which is determined by the relative arrangement and number of the cutters on the shaft.

The stalks cut in the manner described are drawn into the furrows at the sides of the ridges, where they are subsequently covered by the furrows turned in the plowing operation, to be utilized as a fertilizing material for the next crop.

I claim—

The frame A having a series of longitudinal openings to receive cutters, and mounted on wheels having fixed axles, in combination with one or more star-shaped cutters rigidly fixed upon the shaft of the bearing-wheels and receiving a rotary motion therefrom, and working in concert with depending stationary knives, substantially as shown and described.

In testimony that I claim the foregoing I have hereunto set my hand this 29th day of April, 1873.

BENJAMIN R. HARNESS.

Witnesses:
ALBERT H. NORRIS,
JAMES L. NORRIS.